Aug. 5, 1969  D. D. CALL  3,459,473

CONCENTRIC LENS STABILIZATION SYSTEM

Filed Oct. 12, 1965  4 Sheets-Sheet 1

Fig.1.

Inventor:
Daniel D. Call.
By Griffin and Branigan
Attys

Inventor:
Daniel D. Call
By Griffin and Branigan
Attys

Inventor:
Daniel D. Call.
By Griffin and Branigan
Attys

United States Patent Office 3,459,473
Patented Aug. 5, 1969

3,459,473
CONCENTRIC LENS STABILIZATION SYSTEM
Daniel D. Call, Mount Prospect, Ill., assignor to Bell &
Howell Company, Chicago, Ill., a corporation of Illinois
Filed Oct. 12, 1965, Ser. No. 495,204
Int. Cl. G03b 3/00
U.S. Cl. 352—140                                27 Claims

ABSTRACT OF THE DISCLOSURE

A cylindrical lens support member is gimbal mounted in a camera. A lens to be stabilized is mounted on one end of the lens support and a spherically surfaced hollow rotor is concentrically rotatably mounted on the other. A drive means frictionally engages a portion of the rotor's spherical surface so as to spin the rotor about the lens support so that both it and the lens are spatially stabilized. The frictional drive forces on the rotor's surface are selectively adjustable to vary the precession rate of the rotor, the lens support and the stabilized lens. The stabilized lens is mounted adjacent a second camera lens to form a Boscovich type of wedge so that the image at the focal plane of the wedge remains stable even though the camera housing is subjected to undesirable vibrations.

---

This invention relates to stabilized lens systems and more particularly to a mechanism for stabilizing the lenses of cameras, telescopes, field glasses, or other optical instruments against vibratory motions.

Whether optical instruments are hand held or mounted upon a platform which is subjected to vibratory motion, the lenses thereof are generally unavoidably vibrated, thereby resulting in an undesirable image at the focal plane. This is particularly true in the case of a movie camera where vibrations are recorded on successive frames of film which, when magnified during projection, produce a picture which is unpleasant to view and in some instances unintelligible. It is an object of this invention, therefore, to provide a lens stabilization system wherein undesired vibrations are eliminated from the image at the instrument's focal plane, whether they are caused by an operator or a vibrating platform.

It is a more particular object of the invention to provide a movie camera which will produce a stable, nonvibratory picture whether the photographer takes pictures while walking, riding in a car, or even flying in an aircraft in which case the camera is subjected to both severe aircraft vibrations as well as the normal jiggle introduced by the photographer. The invention, however, is not limited to the field of hand held movie cameras. It also has great utility in other fields such as military optical instruments. For example, the Navy has refrained from using high power binoculars because the users thereof have been unable to hold the binoculars sufficiently stable to focus upon the object which it is desired to view. The naval forces have even been unable to take full use of the recent developments in the area of telescopic zoom lenses. Again, this is because the users have been unable to focus on the desired object during high zoom lens magnification. This is so even when the binocular or telescope is not hand held, but rather is fastened to a bracket rigidly mounted to a ship, for example.

The invention has wide use in the field of aerial photography where stabilized moving pictures are rare indeed. Similarly, ground monitored visual guidance systems for missiles have generally proved ineffective because the image received by the ground monitoring station has been too unstable for the operator to accurately detect a target. The system of the invention remedies this situation. In addition, the invention has great utility for use in observational devices currently being used by the Army in tactical reconnaissance aircraft. For example, the Army has recently experienced difficulties with its helicopter gunners losing sight of a target as soon as the guns are fired. That is, the vibrations from the guns cause related optical sighting systems to jiggle so much that the operator cannot focus on the target. In fact, it is for this reason that many land based anti-aircraft weapons have the sighting systems thereof sufficiently removed from the gun mounting that the gun vibrations do not interfere with the optical sighting mechanisms. By using an optical stabilization system in accordance with the instant invention an operator's ability to visually focus on a desired object is not impeded by platform vibrations. Hence, the sighting mechanism can be located at the gun mount.

One means for accomplishing this is to use the lens itself as a rotor of a gyroscope. That is, the lens that it is desired to stabilize is rapidly spun about its optical axis so that its angular momentum permits it to resist vibratory motion away from its spin axis. In this manner, the lens is stabilized. This type of device, although quite suitable in most of its applications, has drawbacks which limit its use. For example, when the rapidly spinning lens is used in color photography the resulting photograph tends to have color fringing effects which severely detract from the quality of the picture. Consequently, it is an object of this invention to provide a stabilized lens system that possesses high quality color characteristics. It is a more specific object of the invention to provide a lens system that is not only stabilized by means of a rapidly spinning mass, but one wherein the undesirable color fringing effects of the spinning lens type of system are eliminated.

Others of the present lens stabilization systems have a tendency to nutate when the optical instrument with which it is associated is subject to very large amplitude vibrations. In systems where a spherical surface is spun by a friction drive this problem can be solved by increasing the friction between the drive means and the spherical surface. This, however, renders the lens stabilization system less senstitive to high frequency vibrations of a lower amplitude. Consequently, it is another object of this invention to provide a lens stabilization system wherein the stabilized lens is not only free from nutational tendencies but is also sensitive to high frequency, low amplitude vibrations.

In accordance with the principle of the invention the lens which it is desired to stabilize is mounted on a lens support structure which in turn is suspended within the associated instrument by means of a gimbal suspension system. A rotor is mounted on the lens support so that it is concentrically rotatable with respect to the lens. A drive means is provided to spin the rotor so that it is stabilized in space. That is, the rotor's angular momentum about its spin axis causes it to tend to resist motion away from that spin axis. Because the rotor is concentrically rotatably mounted on the lens support means, the lens too is stabilized in space within the limits of its gimbal suspension system. Consequently, the invention provides for a lens stabilization system that has the stabilizing benefits of spinning lens systems, but wherein the adverse color effects of a spinning lens are eliminated.

It is another object of this invention to provide a lens stabilization system that not only compensates for instrument vibrations, but is also of the "self-erecting type." That is, the device has a characteristic that the rotor's spin axis automatically follows and strives steadily to align itself with the axis of its driving member so that the lens always tends to become aligned with the instrument. This erection is accomplished by a precessional torque, the magnitude of which increases as the deviation of the spin axis from the driving axis increases.

Consequently, in accordance with another aspect of the invention a friction drive means contacts the surface of the stabilization system's rotor so that rotation of the drive means causes the rotor to spin. When the axis of the drive means changes its position relative to the spin axis of the rotor the frictional forces between the drive means and the rotor's surface cause the rotor, the lens support member, and the lens to precess so that the common axis of the lens and rotor realigns itself with the drive axis of the drive means.

It is often desirable to be able to selectively vary the frequency at which a stabilized lens becomes sensitive. For example, when an optically stabilized binocular is being used aboard a slowly rolling ship, for example, the user might like to filter out the ship's roll. In this situation the user would like to have the binocular's lenses remain stable with respect to the binocular's case for low frequency high amplitude vibrations. If the user desires to pan the horizon, however, he would prefer to have the binocular's lenses follow the motion of the binocular case. In this latter situation, the user would like to have a system that is insensitive to low frequency, high amplitude vibrations. Consequently, it is yet another object of this invention to provide a lens stabilization system which is adapted so that the user can selectively vary the vibration frequency at which the lens approaches a predetermined degree of sensitivity.

In order to fulfill the above object and in accordance with another aspect of the invention the friction drive means is comprised of one or more driving elements that are spring biased towards the spherically surfaced rotor. The drive means is adapted to have its driving speed selectively varied. As the speed of the drive means is increased centrifugal force gradually counteracts some of the force biasing the drive elements towards the rotor. Hence, the frictional forces between the drive elements and the rotor become less as the speed of the drive means increases. Consequently, for a given amount of misalignment between the lens axis and the drive axis, the precessional forces of the spring biased driving means upon the rotor's spherical surface are less for higher drive speeds. In this manner the rate at which the lens and rotor precess into alignment with the drive axis are selectively varied merely by varying the drive speed.

By mounting the stabilized lens and concentric rotor in a gimbal suspension system within the housing of an optical instrument the lens is effectively freely suspended within the instrument, although stabilized in space by its concentric rotor. Hence, although the instrument may be subjected to external vibrations the lens remains substantially stable in space. On the other hand, if the instrument is relatively slowly rotated such as, for example, when a photographer pans a camera, the forces between the drive means and the rotor tend to cause the lens to precess so as to follow this slow motion of the instrument. Consequently, the lens, although not sensitive to undesired vibrations, within practical limits follows intentional motion of the instrument.

By mounting a mating lens in the housing in front of the stabilized lens so as to form a Boscovich type of wedge, an image viewed through the wedge and a focusing lens remains stable at the focal plane of the focusing lens irrespective of the motion between the wedge elements. A wedge of this type is more fully described and explained in U.S. Patent No. 2,180,217 entitled, "Camera With Range Finder," and issued to Carl Ort on Nov. 14, 1939. In this manner, the image at the focal plane of the focusing lens remains stable even though the housing of the optical instrument is subjected to undesirable vibrations. Moreover, when the instrument is panned relatively slowly the stabilized lens structure, by virtue of its precessive ability, is adapted to have the image of the thusly panned subject stably appear at the instrument's focal plane.

An advantage of the instant invention is that it is a relatively simple device which is quite easily manufactured, susceptible to large tolerances, and therefore capable of being manufactured at low cost. Another advantage of the invention lies in its structural compactness. That is some of the presently available lens stabilization mechanisms have their axes offset, whereby their presence in a small movie camera, for example, renders the camera rather bulky. Because of its concentric mounting the structure of the instant invention may be housed in a relatively small volume. For this reason, the structure of the instant invention is admirably suited for use in hand held instruments where compactness is such a desirable feature.

A movie camera is perhaps the most common type of optical device wherein instrument vibration will defeat the purposes for which the instrument is intended. For this reason, although suitable for use in a wide variety of instruments, a preferred embodiment of the invention will herein be illustrated as being used in combination with a movie camera.

The foregoing and other objects, features, and advantages of this invention will be apparent from the following more particular description of a preferred embodiment thereof illustrated in the accompanying drawings; wherein the same reference numerals refer to the same parts throughout the various views. The drawings are not necessarily intended to be to scale but rather are presented so as to illustrate the principles of the invention in clear form.

Figure 1:
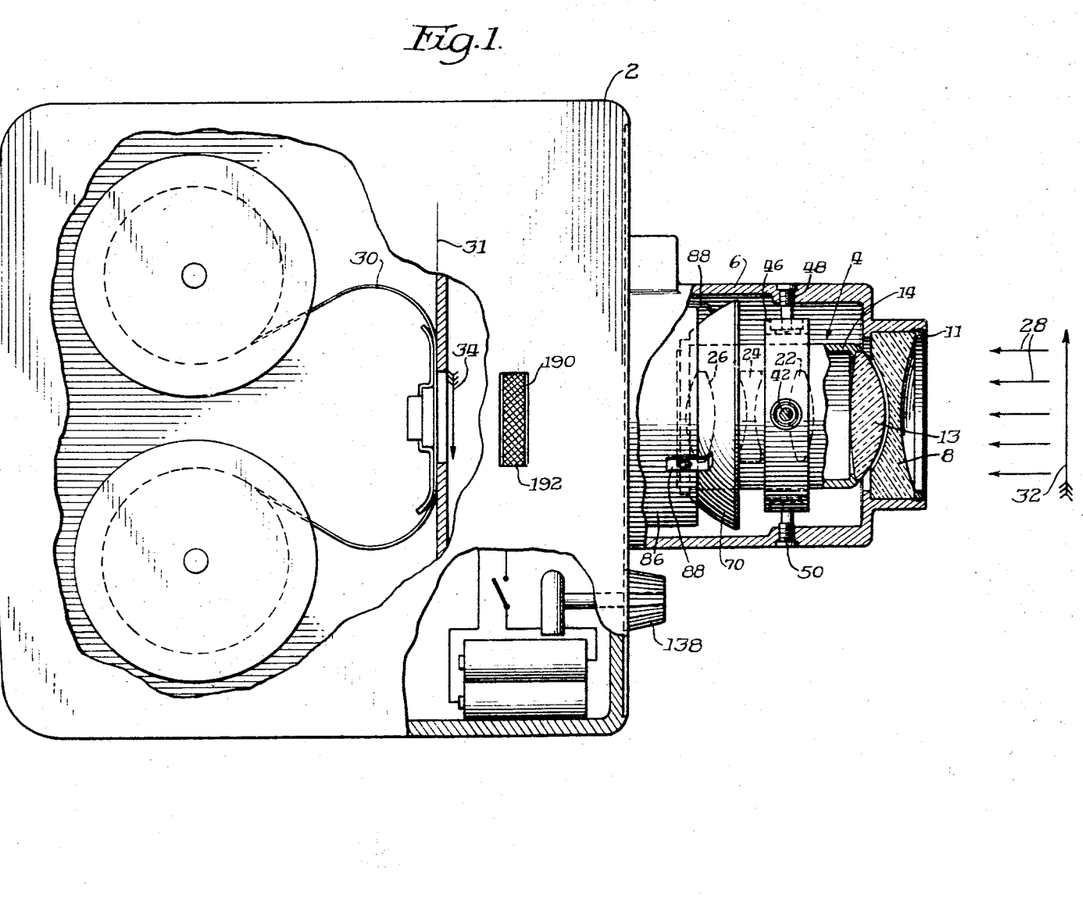
FIG. 1 is a side view of a camera partially broken away to illustrate the incorporation therein of an embodiment of the invention illustrated in FIG. 2.
Figure 2:
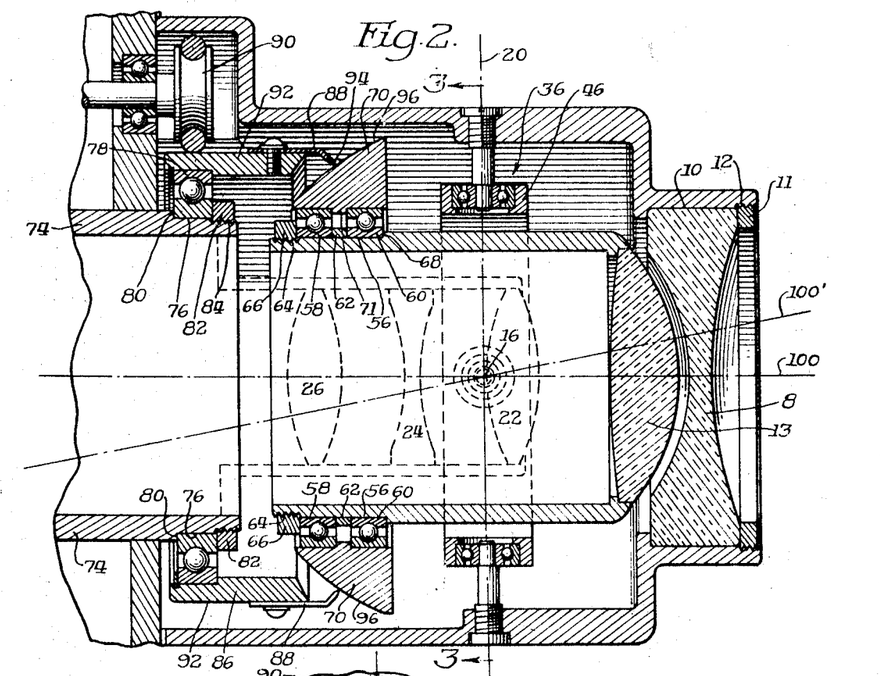
FIG. 2 is a side sectional view of a lens stabilization device embodying the invention.

Referring now to FIG. 1; a movie camera 2 has a preferred embodiment of a lens stabilization system 4 mounted in a housing 6 at the forward end of the camera. A lens element 8 is mounted in a groove 10 of the housing as shown in FIG. 2 which illustrates an embodiment of the lens stabilization system 4 as it is broken out of the camera of FIG. 1. The lens element 8 is retained in the groove 10 by means of a retainer ring 11 which is threadably mounted in a mating portion 12 of the camera housing's groove 10.

Figure 3:
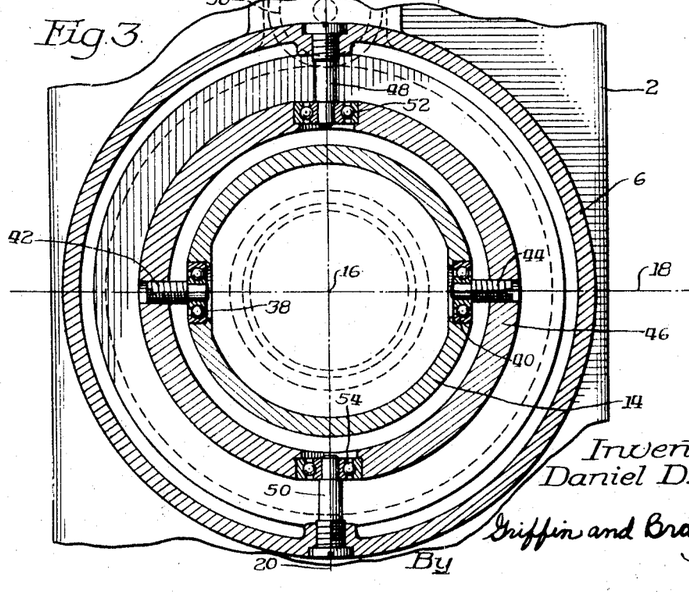
FIG. 3 is a sectional view of the embodiment of the invention illustrated in FIG. 2 taken along the lines 3—3 thereof.

A spherical lens element 13 is located at the right end of a substantially cylindrical lens support member 14 in FIGS. 1 and 2. As will be more fully described later the lens element 13 has its center of curvature at point 16 which represents the intersection of a horizontal axis 18 and a vertical axis 20 (FIG. 3). Focusing lenses 22, 24, and 26 are mounted within the cylindrical member 14 as shown in outline form in FIG. 2.

Light entering the camera from the right in FIG. 1 as illustrated by the arrows 28 is permitted to pass through the optical wedge formed by the lens elements 8 and 13; through the focusing lenses 22, 24, and 26; and onto the camera's film 30 located at the focal plane 31 of the camera's lens systems. In this manner an object 32, which it is desired to photograph, has its image 34 focused on the camera's film 30 as shown in FIG. 1. This is more fully illustrated schematically in FIGS. 4, 5, and 6 and will be referred to in more detail later.

The lens support member 14 is mounted within the camera housing 6 by means of a gimbal suspension system 36 as will now be described. The lens support member has bearing assemblies 38 and 40 mounted in the sides thereof as shown in FIG. 3. Gimbal pins 42 and 44 are fixed at one end to a gimbal ring 46. The other ends of the gimbal pins 42 and 44 are inserted into the bearing assemblies 38 and 40 respectively, for pivotal motion about the horizontal axis 18. Gimbal pins 48 and 50 are fastened at one end to the camera housing 6 and are inserted at their other ends into bearing assemblies 52 and 54 respectively which are mounted in the gimbal ring 46 on an axis which is orthogonal to the axis through the bearing assemblies 38 and 40. In this manner, the lens support member 14 is free to pitch about the horizontal axis 18 and yaw about the vertical axis 20 in FIG. 3, all such motion being about the point 16 which is at both the intersection of the axes 18 and 20 as well as the center of curvature of the lens 13.

As shown in FIG. 2 the left hand end of the lens support member 14 is recessed at 56 to accommodate two bearing assemblies 58 and 60. The inner-races of bearing assemblies 58 and 60 are pressed onto the recessed portion 56 of the lens support member. A bearing spacer ring 62 is also pressed onto the recess 56 as shown in FIG. 2 to hold the bearing assemblies 58 and 60 in a spaced apart relationship. The recess 56 is threaded at its leftmost portion 64 to accommodate a correspondingly threaded retaining ring 66. When the retaining ring is threaded onto the recess it acts to snug the inner race of the bearing assembly 60 against a shoulder 68 on the lens support member 14 and also maintains the bearing assemblies 58 and 60 and the spacer ring 62 in a fixed position.

A rotor 70 is pressed onto the outer races of the bearing assemblies 58 and 60 with spacer ring 71 of the rotor extending therebetween. Hence, the rotor is rotatable about the axis of the lens support member 14 and the stabilized lens 13. Hence, the spin axis of the rotor and the axis of the stabilized lens 13 are superposed and move together at all times.

A drive support barrel 74 is rigidly affixed to the camera housing by means not shown. At its right end the drive support barrel is recessed at 76. The inner race of a bearing assembly 78 is pressed into the recess 76 and snugged up against a shoulder 80 on the drive support barrel by a threaded retaining ring 82 which is affixed to a correspondingly threaded portion 84 of the drive support barrel 74. A driving ring 86 is pressed onto the outer race of the bearing assembly 78 as shown in FIG. 2. A plurality of somewhat flexible driving fingers 88 extend to the right from the driving ring assembly 86. A rubber driving ring 90 is spun by a drive motor, as shown in FIG. 2, and engages a substantially cylindrical portion 92 of the driving ring assembly 86. Driving edges 94 extend inwardly from the ends of each of the driving fingers 88 and frictionally engage a spherically surfaced portion 96 of the rotor 70.

By rotating the rubber drive ring 90 the driving ring assembly 86 is rotated on the drive support barrel 74 about a drive axis which is superposed upon the axis of the lens 8. When the driving ring assembly is thusly rotated the frictional forces between its driving edges 94 and a spherical surface 96 of the rotor 70 cause the rotor to spin about the drive axis. At this time, the axes of the lens 8, the lens 13, the rotor 70 and the driving ring assembly 76 are all superposed and represented by a neutral or spin axis 100 in FIG. 2.

In operation, as the rotor 70 is spun about its spin axis it acts as the rotor of a gyroscope. Hence, both it and the lens 13 are stable in space about the rotor's spin axis 100. The camera housing 6, however, is free to move with respect to the spin axis. The camera housing's freedom of movement is obtained by reason of its ability to pivot about the horizontal and vertical axes 18 and 20 which are defined by the gimbal pins 42, 44, 48, and 50. In FIG. 3 for example, the lens support member 14 is maintained stationarily with respect to pivotal motion about the horizontal axis 18 in FIG. 3 (appearing as a point in FIG. 2). The camera housing, as represented by the axis of the lens 8, is free to pivot about the axis 18 by means of rotation of the horizontal gimbal pins 42 and 44 in their respective bearing assemblies 38 and 40. When this occurs the flexible drive fingers 88 slide across the spherical surface 96 of the rotor 70. The camera housing is similarly pivotable with respect to both the spinning rotor assembly and the lens 13, about the vertical axis 20 passing through the vertical gimbal pins 48 and 50. Consequently, after the rotor has obtained its spatial stability, motion of the camera housing away from the spin axis 100 causes the axis of the lens 8 to become displaced from both the rotor's spin axis and the axis of the lens 13. Because this will be described in more detail shortly, the vertical displacement about the horizontal axis 18 is merely represented in FIG. 2 by a displaced axis 100' representing the displaced axis of the lens 8.

Figure 4:
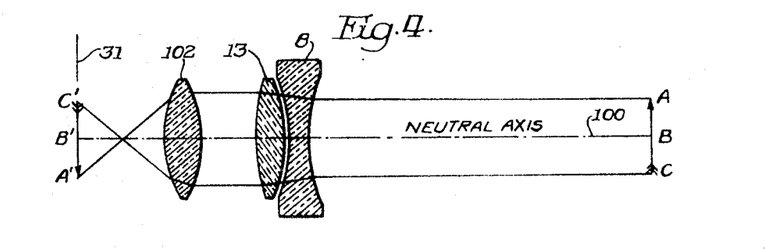
FIG. 4 is a schematic diagram of an image received at the focal plane of a camera as the camera views an object.
Figure 5:
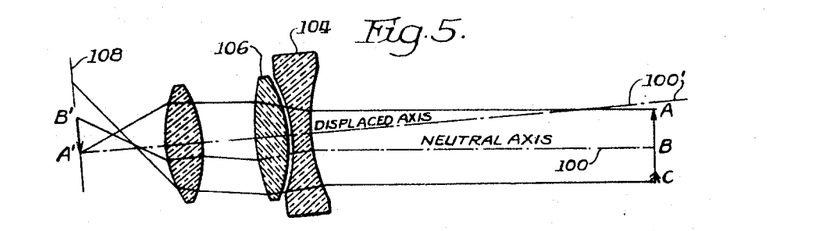
FIG. 5 is a schematic diagram illustrating the image that would be received by an unstabilized lens system when the camera of FIG. 4 is subject to vibration.
Figure 6:
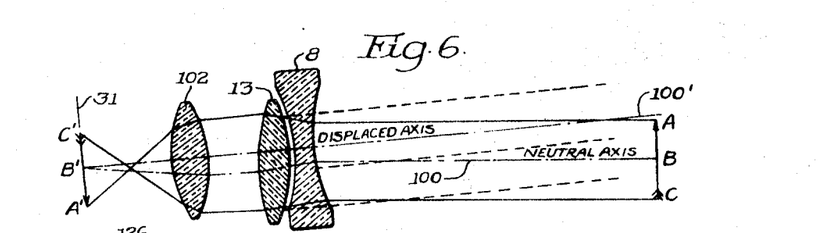
FIG. 6 is a schematic diagram of the image at the focal plane when a camera embodying the invention is subjected to a vibration.

Referring to FIGS. 4, 5, and 6, the optical operation of the above described preferred embodiment of the invention will now be described. Turning first to FIG. 4 the arrow ABC represents an object which it is desired to photograph at a time when the lens stabilization system 4 is in its neutral position. That is, when the axis of the lens 8 and the spin axis of the rotor 70 are superposed. At this time, light rays coming from the right in FIG. 4 pass through the lens elements 8 and 13, which form a Boscovich type of wedge, then through the focusing lenses (represented schematically by lens 102) from which an inverted image of the object A'B'C' is focused at the focal plane 31 of the camera.

FIG. 5 illustrates a camera which does not have a stabilized optical system and which has lens elements 104 and 106 corresponding to the previously described lens elements 8 and 13. The camera is shown as being displaced off of its neutral axis such as occurs, for example, when a photographer holding a movie camera in his hand walks along the ground while photographing. The distance between the displaced axis and the neutral axis in the schematic, therefore, represents the amount of jiggle which is introduced by the photographer. In this case, the object which it is desired to photograph (arrow ABC) has only a portion of its image formed at the focal plane 108 of the camera having the unstabilized lens system. That is, only the AB portion of the object has an image thereof, A'B' formed at the focal plane. The BC portion of the object is not photographed. This illustration corresponds to the often observed shortcoming of home movies wherein the photographer successively cuts off the feet and then the heads of the persons he photographs while he is walking.

FIG. 6 illustrates the operation of a camera employing the stabilized lens system of the invention. In this case, the photographer has moved the camera off of its neutral axis in the same manner that the camera was moved in connection with FIG. 5. Here the lens element 13 maintains its stability about the neutral axis which in this case is its spin axis. The lens element 8 and the camera's focusing lenses (again represented by the single lens 102) however, are displaced along with the camera housing as shown. With respect to the camera housing, therefore, the lens 8 is fixed, while the other lens 13 is relatively movable although stationary in space. For this reason, the entire image A'B'C' of the object ABC is placed upon the focal plane 31 of the camera just as though the camera had not been displaced. Thus, the lens stabilization system of the invention eliminates the photographic effects of undesired vibrations caused by the photographer. Moreover, even if the platform upon which the photographer is located is subjected to random vibrations in addition to those caused by the photographer, the image at the focal plane of the camera will be further compensated whereby the undesired vibrations will not show up in the final photographs.

The above described structure provides a stabilized lens wherein the lens itself is neither offset from the axis of the stabilizing rotor nor spun so as to act as its own rotor. Consequently, both the bulky structure of the offset rotor type of device and the undesirable color fringing effects of the spinning lens devices are avoided. The structure of the invention, therefore, is particularly well suited for small hand held optical instruments where high quality color characteristics are required.

It will be appreciated by those skilled in the art that although the invention has been illustrated in connection with a movie camera wherein the vibrations are introduced by a photographer, that a similar structure is easily incorporated into binoculars, telescopes, gunsights, or other optical instruments. Moreover, although the invention is particularly well suited for hand held optical instruments wherein weight and compactness are prime requisites the invention is not at all limited thereto. For example, the invention is equally applicable to optically guided missile systems.

Although the rotor has been described as being frictionally driven it should be noted that in some instances it may be more convenient to drive the rotor by some other suitable means such as a magnetic drive, for example. In this case certain structural modifications are required, but these are not of the type that cause a departure from the spirit and scope of the instant invention and hence will not be further described.

When a photographer takes pictures with a movie camera he frequently desires to obtain a panoramic view of a particular scene. Hence, he swings the camera through an arc about his body as an axis. This operation is normally referred to as "panning. If the user of a telescope pans too rapidly the fact is immediately apparent to him because his view is not what he would like it to be. When the viewer intends his efforts to be used in a secondary manner, such as the direction of a gun barrel or the recording of a field of view on film, he is not so immediately aware of his error. In the case of a movie camera, for example, there is no correlation between the ability of the user's eye to adapt to a changing field of view and the ability of the film to record the changing field of view. Indicative of the seriousness of this matter is a recent estimate by a group of trade association members in the camera field that 80% of all home movie film spoilage results from the operator panning too rapidly. It can be appreciated, therefore, that the desire of a photographer to pan is very great. It is for this reason that the stabilized lens system of the instant invention is adapted so that the operator can pan the camera or other optical instrument and still receive the desired stable image at the instrument's focal plane. This aspect of the invention will now be described.

The description of the invention thus far, has been directed primarily to low amplitude, high frequency vibrations that are normally associated with the undesirable jiggle which is common in moving picture photographs for example. Panning, on the other hand, represents an extremely high amplitude, low frequency vibration. So much so, that it is not normally considered a vibration at all and clearly not an undesirable one. In order to permit panning, therefore, the stabilized lens system of the invention is adapted to erect itself so that its spin axis 100 (the neutral axis in FIGS. 4–6) is very slowly brought into alignment with the displaced axis 100' of the lens 8 which is affixed to the camera housing. This is accomplished by the gyroscope action of the above described rotor assembly.

Gyroscopic action is the tendency of a rapidly spinning body to turn about a second axis not parallel to the axis of spin, when acted upon by a torque about a third axis. Generally, the second axis is referred to as the precession axis and the third axis is referred to as the torque axis. Moreover, the rapidly spinning body tends to move in a direction which is perpendicular to the force which causes the torque. The reason that the spinning body moves perpendicularly to the direction of the force is because the angular momentum vector of the spinning body moves into alignment with the torque vector caused by the force acting upon the body, giving rise to motion about a third axis called the precession axis which is orthogonal to both the momentum and torque vectors.

In the instant case it is the frictional force between the flexible driving fingers 88 and the spherical surface 96 of the rotor 70 which causes the torque required for the rotor, and thereby the stabilized lens, to precess into alignment with the axis of the camera housing's lens 8 during panning. That is, the fractional forces between the flexible driving fingers and the rotor create a torque about an axis which is perpendicular to the rotor's spin axis. Consequently, by gyroscopic action the rotor precesses about an axis perpendicular to the torque axis which, in this case, brings the stabilized lens 13 back into alignment with axis 100' of the camera housing's lens 8. As soon as the spin axis of the rotor is aligned with the axis of the camera housing's lens 8, however, there is no torque about the torque axis and precession ceases. It should be appreciated, however, that this friction erection is a relatively slow process as compared with the frequency of the undesired vibrations which have been previously discussed. Consequently, although the lens system of the invention follows the relatively slow panning motion by the photographer, any undesired vibrations occurring during this panning are effectively filtered out, whereby only the desired motion is recorded on the film.

Figure 7:
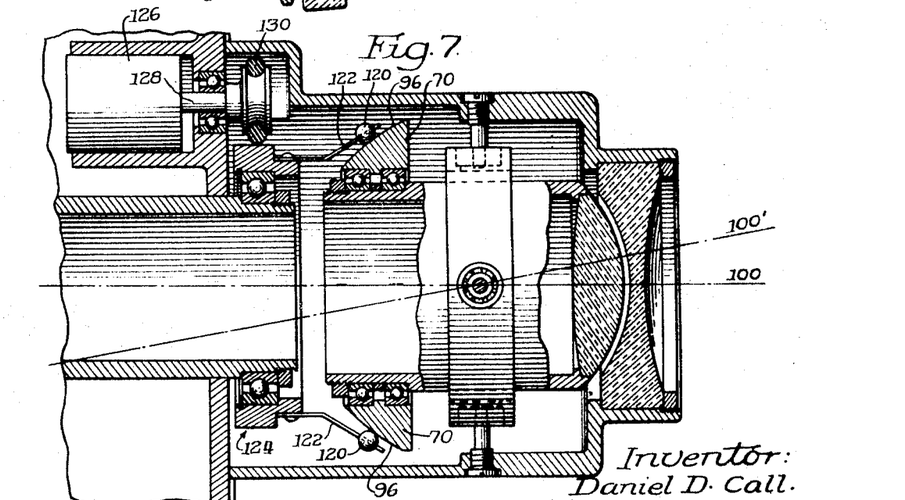
FIG. 7 is a side view partially in section of an alternative embodiment of the invention illustrated in FIG. 2.
Figure 8:
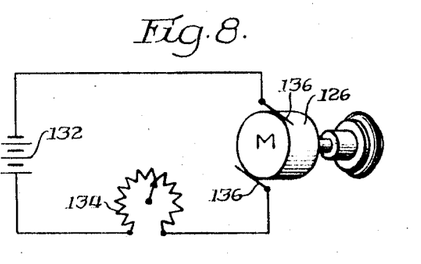
FIG. 8 is a schematic illustration of an electrical circuit which is suitable for use with the embodiment of the invention illustrated in FIG. 7.

Turning now to FIGS. 7 and 8, another aspect of the invention will be discussed wherein the lens system's erection rate can be selectively varied. In FIG. 7 the driving fingers 88 are replaced by driving balls 120 which are mounted on the ends of spring fingers 122 affixed to a driving ring assembly 124 corresponding to the driving assembly 86 of FIG. 2. The spring fingers 122 are biased inwardly towards the rotor's spin axis so that they exert a relatively large force on the rotor's spherical surface 96 when the driving ring assembly is stationary.

A drive motor 126 causes a shaft 128 to rotate a rubber drive ring 130. As the rubber drive ring 130 rotates it drives the drive ring assembly in the same manner as described in connection with FIG. 2. As the driving balls 120 are thereby rotated, however, centrifugal force begins to overcome the spring bias of the spring fingers 122 and urges the balls outwardly from the rotor. Although as a practical matter the driving balls do not leave the surface of the rotor, the force of the balls upon the rotor's spherical surface decreases as the speed of the driving ring increases.

As shown in FIG. 8, the drive motor 126 receives its power from a battery 132 through a rheostat 134 and a set of brushes 136. The rheostat is controlled by any convenient means such as a rheostat control knob 138 located on the front of the camera 2 in FIG. 1 for example.

In operation, as the rheostat control knob is turned so as to increase the portion of the rheostat's resistance in the drive motor's control circuit, the speed of the drive motor decreases. As the speed of the drive motor decreases the drive balls 120 exert a greater force on the rotor's spherical surface 86, whereby the frictional forces between the driving balls and the rotor are increased. Hence, when the instrument is panned so that the drive axis 100′ becomes displaced from the spin axis 100 the frictional forces causing the rotor and the lens to erect themselves are greater and erection occurs at a faster rate. Consequently, if it is desired to pan the instrument more rapidly it is merely necessary to turn the rheostat knob 138 so as to increase erection forces between the drive balls and the rotor, whereby the stabilized lens 13 follows the motion of the camera housing's lens element 8 more rapidly.

The panning rate adjustment feature of the instant invention has been described in connection with driving balls 120. It will be appreciated, however, that a centrifugally governed variable friction erection system could also be obtained by using some other convenient type of drive element in place of the spring loaded balls. One alternative would be to drive the rotor by weighted spring fingers, for example.

Figure 9:
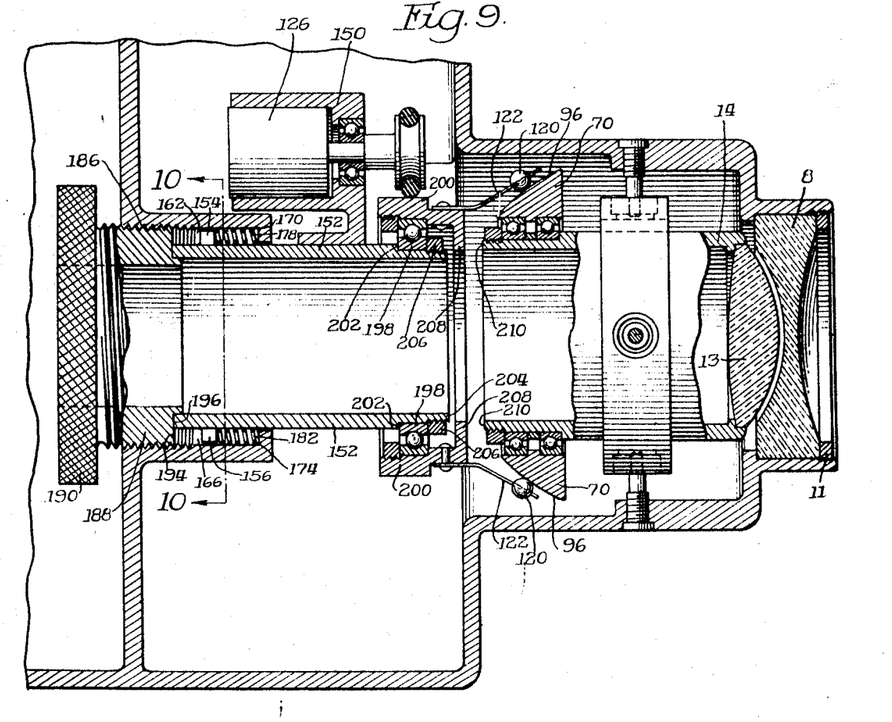
FIG. 9 is a side view partially in section of yet another alternative embodiment of the invention depicted in FIG. 2.

FIG. 9 illustrates another embodiment of the invention wherein a variable friction erection rate is obtained by varying the axial position of the spring biased drive balls 120. In FIG. 9 the drive motor 126 is mounted on a bracket 150 which is affixed to a drive support barrel 152 similar to the drive support barrel 74 described in connection with the embodiment of the invention illustrated in FIG. 2. The drive support barrel 152, however, is not affixed to the camera housing as is the case with the drive support barrel 74. Instead, the drive support barrel 152 (and thereby the drive motor and driving ring assembly) is axially slidable within the camera housing as will now be described.

Figure 10:
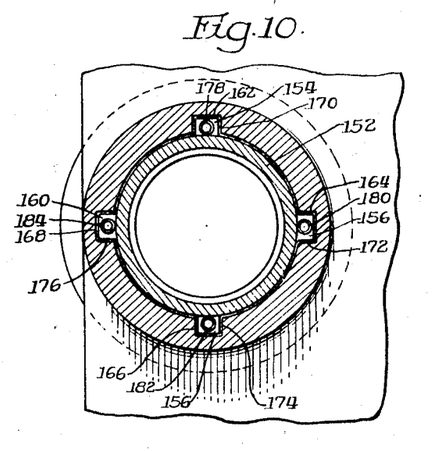
FIG. 10 is a sectional view of the embodiment of the invention shown in FIG. 9 taken along the lines 10—10 thereof.

The drive support barrel 152 has keys 154, 156, 158, and 160 spaced about the left end of its circumference as shown in FIGS. 9 and 10. The keys are adapted to slide in keyways 162, 164, 166, and 168, respectively, of the camera housing. The keyways terminate at their right ends at shoulders 170, 172, 174, and 176, respectively, and have springs 178, 180, 182, and 184, also respectively, located therein between each key and its associated shoulder. The camera housing is threaded at 186 to accommodate a hollow threaded plug 188. The plug 188 has a knurled knob 190 on one end thereof which is located within the camera so as to extend a slight distance out of the camera body through an aperture 192 as shown in FIG. 1. The other end of the plug 188 has a groove 194 running about its circumference. The face of the groove contacts the end 196 of the drive support barrel 152. The other end 198 of the drive support barrel 152 accommodates a drive ring assembly 200 which, with one exception to be described later, is substantially the same as the drive ring assembly described in connection with FIG. 7.

The springs 178–184 urge the respective keys 154–160, and thereby the drive support barrel 152, to the left in FIG. 9 so that the end 196 of the drive support barrel 152 is in firm contact with groove 194 of the hollow threaded plug 188. As the operator turns the knurled knob 190 so as to screw the plug 188 into the threaded portion of the camera housing 186, the drive support barrel is urged to the right against the forces of the springs 178–184. As the drive support barrel moves to the right the drive motor and drive ring assembly also move to the right in FIG. 9 causing the driving balls 120 to move outwardly on the surface 196 of the rotor 70. As the balls 120 move outwardly the inward biasing force of the springs 122 increases and the frictional forces between the driving balls and the rotor increase. As these frictional forces increase the erection rate of the rotor also increases. Hence, as was similarly described in connection with FIG. 7, the erection rate of the rotor is selectively varied by selectively varying the position of the driving balls with respect to the rotor. In the embodiment of the invention described in connection with FIG. 7, however, the axial position of the driving balls remained constant and the frictional forces between the driving balls and the rotor decreased as an increase in centrifugal force overcame the balls' biasing forces. In the structure of FIG. 9, on the other hand, the rotary speed of the driving balls is held constant while the driving balls are moved axially. In this case, therefore, the friction erection forces increase as the driving balls move outwardly. Consequently, if it is desired to pan the instrument more rapidly it is merely necessary to screw plug 188 inwardly, whereby the stabilized lens 13 will more rapidly follow the motion of the camera housing's lens element 8.

The driving ring assembly 200 of the embodiment of the invention just described is mounted on the drive support barrel 152 in a manner similar to that described in connection with the structures of FIGS. 2 and 7. That is, the inner race 198 of a bearing assembly 200 is snugged up against a shoulder 202 on the right end 204 of the lens support barrel 152 by a threaded retainer ring 206. Although the spring biased driving fingers 122 are fastened to the driving ring assembly in the same manner as was previously described, a caging arm 208 extends inwardly from the driving ring assembly from each of the driving fingers 122 as shown in FIG. 9. These caging arms are adapted to press against the left end 210 of the lens support member 14 whenever the threaded plug 188 is screwed all of the way to the right in FIG. 9. Hence, when the caging arms contact the lens support member the lens 13 is effectively affixed to the camera housing and thereby caged. When the associated optical instrument is not in use, therefore, the stabilized lens can be caged so as to prevent damage to both it and its associated driving and gimbal suspension systems.

It will be appreciated by those skilled in the art that the above described structure provides a lens stabilization system that is both compact and free from the undesirable color fringing effects of the spinning-lens type of stabilization systems. In addition, the vibration frequency at which the lens approaches a predetermined degree of sensitivity is selectively variable. In this manner, the instrument is adaptable to the conditions under which the operator desires to use the device. In other words, the operator is able to select the frequency at which the stabilized lens becomes sensitive.

For ease of illustration the action of the various embodiments of the invention has been described in connection with panning and vibration in a vertical plane. However, it will be understood that each of the embodiments disclosed herein works equally well when the motion resulting from either panning or vibration has only a horizontal component or has both a vertical and a horizontal component. Also, it will be apparent to those skilled in the art that although the above described embodiments of the invention have been described in connection with a movie camera that the invention is readily adaptable to other optical instruments. For example, the lens stabilization system such as is provided by the instant invention, when coupled to the objective lens of a zoom binocular, will permit this desirable type of binocular to be used even on the high seas while a ship is pitching and rolling and subjected to severe engine vibrations.

While the invention has been particularly shown and described with reference to preferred embodiments thereof, it will be understood by those skilled in the art that various changes in form and details may be made therein without departing from the spirit and scope of the invention.

The embodiments of the invention in which an exclusive property or privilege is claimed are defined as follows:

1. In a system for stabilizing a lens about the optical axis thereof, the combination comprising:
   a housing;
   a lens support means having first and second ends thereof, said lens being mounted in said first end of said lens support means;
   a gimbal suspension means mounting said lens support means and thereby said lens in said housing;
   a spherically surfaced hollow rotor concentrically rotatably mounted on said second end of said lens support means for concentric rotation with respect to said lens support means about the axis of said lens; and
   drive means operative in combination with the spherical surface of said rotor to rotate said rotor, whereby said lens support and thereby said lens are spin stabilized.

2. The apparatus of claim 1 wherein the center of curvature of said spherical surface is located at the center of said gimbal suspension system.

3. The apparatus of claim 1 wherein said drive means drives said rotor by frictionally contacting only a portion of said spherical surface.

4. The apparatus of claim 3 including a biasing means for biasing said drive means into engagement with said spherical surface of said rotor.

5. The apparatus of claim 4 wherein said biasing means is adapted to be responsive to the speed of said drive means so that a change in the speed of said drive means changes the biasing force of said biasing means; and means to selectively vary the speed of said drive means whereby the frictional forces between said drive means and said spherical surface, and thereby the precession rate of said rotor, are selectively variable.

6. The apparatus of claim 4 wherein said drive means is coaxial with said rotor;
   and including means to selectively vary the axial position of said drive means with respect to said rotor whereby the frictional forces between said drive means and said spherical surface, and thereby the precession rate of said rotor, are selectively variable.

7. The apparatus of claim 6 including a caging means operative in response to a predetermined amount of axial motion of said drive means with respect to said rotor to cage said rotor.

8. The apparatus of claim 7 wherein said drive means drives said rotor by frictionally contacting only a portion of said spherical surface.

9. The apparatus of claim 8 including a biasing means for biasing said drive means into frictional contact with said spherical surface of said rotor.

10. The apparatus of claim 9 wherein said biasing means is adapted to be responsive to the speed of said drive means so that a change in the speed of said drive means changes the biasing force of said biasing means; and means to selectively vary the speed of said drive means whereby the frictional forces between said drive means and said spherical surface, and thereby the precession rate of said rotor, are selectively variable.

11. The apparatus of claim 9 wherein said drive means is coaxial with said rotor; and including means to selectively vary the axial position of said drive means with respect to said rotor whereby the frictional forces between said drive means and said spherical surface, and thereby the precession rate of said rotor, are selectively variable.

12. The apparatus of claim 11 including a caging means operative in response to a predetermined amount of axial motion of said drive means with respect to said rotor to cage said rotor.

13. In a system for stabilizing a lens about the optical axis thereof, the combination comprising:
    a housing;
    a lens support means having first and second ends thereof, said lens being mounted in said first end of said lens support means;
    a gimbal suspension means mounting said lens support means and thereby said lens in said housing;
    a spherically surfaced hollow rotor concentrically rotatably mounted on said second end of said lens support means for concentric rotation with respect to said lens support means about a spin axis that is common with the axis of said lens;
    drive means mounted within said housing operative in combination with the spherical surface of said rotor to drive said rotor about said spin axis so that said rotor is relatively stable in space about said spin axis;
    said driving means having a drive axis that is fixed with respect to said housing, but movable in space with respect to said common spin and lens axes;
    said drive means being further adapted to coact with said spherical surface of said rotor so as to cause said rotor and thereby said lens to precess into coaxial superposition with said drive means when said drive axis is divergent from said spin axis.

14. In a system for stabilizing a lens about the optical axis thereof, the combination comprising;
    a housing;
    a lens support means having first and second ends thereof, said lens being mounted in said first end of said lens support means;
    a gimbal suspension means mounting said lens support means and thereby said lens in said housing;
    a spherically surfaced hollow rotor, rotatably mounted on said second end of said lens support means for concentric rotation with respect to said lens support means about a spin axis that is common with the axis of said lens;
    rotatable drive means mounted within said housing for rotation about a drive axis and being in frictional engagement with only a portion of said spherical surface, so that said drive axis and said spin axis are movable relative to each other; and
    means to rotate said drive means whereby the friction between said drive means and said spherical surface causes said rotor to spin about said spin axis, said rotor thereby being relatively stable in space about said spin axis, but adapted to precess into coaxial superposition with said drive axis when said drive axis is divergent from said spin axis.

15. In an optical instrument, the combination comprising:
    a housing;
    a first lens mounted in said housing;
    a lens support means having first and second ends thereof;
    a second lens having an optical axis thereof and being mounted in said first end of said lens support means;
    a gimbal suspension means mounting said lens support means and thereby said second lens in said housing, said lens support means being located within said housing so that said first and second lenses form an optical wedge;
    a hollow spherically surfaced rotor concentrically rotatably mounted on said second end of said lens support means for concentric rotation with respect to said lens support means about said optical axis of said second lens; and
    drive means operative in combination with the spherical surface of said rotor to rotate said rotor, whereby said lens support and thereby said lens are spin stabilized.

16. The apparatus of claim 15 wherein the center of curvature of said spherical surface is located at the center of said gimbal suspension system.

17. In an optical instrument the combination comprising:
   a housing;
   a first lens mounted in said housing;
   a lens support means;
   a second lens mounted in said lens support means;
   a gimbal suspension means mounting said lens support means in said housing, said lens support means being located within said housing so that said first and second lenses form an optical wedge;
   a rotor rotatably mounted on said lens support means for concentric rotation with respect to said lens support means about a spin axis that is common with the axis of said second lens;
   drive means mounted within said housing and adapted to drive said rotor about said spin axis so that said rotor and thereby said second lens is stable in space about said spin axis;
      said drive means having a drive axis that is fixed with respect to said housing and said first lens, but movable in space with respect to said common spin and lens axes;
      said drive means being further adapted to coact with said rotor so as to cause said rotor and thereby said second lens to precess into coxial superposition with said drive axis and said first lens when said drive axis and said first lens are divergent from said spin axis.

18. In an optical instrument the combination comprising:
   a housing;
   a first lens mounted in said housing;
   a lens support means;
   a second lens mounted in said lens support means;
   a gimbal suspension means mounting said lens support means in said housing, said lens support means being located within said housing so that said first and second lenses form an optical wedge;
   a spherically surfaced rotor, rotatably mounted on said lens support means for concentric rotation with respect to said lens support means about a spin axis that is common with the axis of said second lens;
   rotatable drive means mounted within said housing for rotation about a drive axis and being in frictional engagement with only a portion of said spherical surface, so that said drive axis and said spin axis are movable relative to each other; and
   means to rotate said drive means whereby the friction between said drive means and said spherical surface causes said rotor to spin about said spin axis, said rotor thereby being relatively stable in space about said spin axis, but adapted to precess into coaxial superposition with said drive axis when said drive axis is divergent from said spin axis.

19. In a moving picture camera which is adapted to focus light rays from an object onto a film station, the combination comprising:
   a camera housing which includes an objective portion and an image portion;
   a first lens mounted in said objective portion of said housing, said film station being at said image portion of said housing;
   a lens support means;
   a second lens mounted in said lens support means;
   a gimbal suspension means for mounting said lens support means in said housing, said lens support means being located within said housing so that said first and second lenses form an optical wedge whereby an image from an object is focused at said film station irrespective of relative motion between said lenses;
   a rotor rotatably mounted on said lens support means for concentric rotation with respect to said lens support means about the axis of said second lens; and drive means to rotate said rotor.

20. The apparatus of claim 19 wherein said rotor has a spherical surface and said drive means drives said rotor by frictionally contacting only a portion of said spherical surface.

21. The apparatus of claim 20 including a biasing means for biasing said drive means into frictional engagement with said spherical surface of said rotor.

22. The apparatus of claim 21 wherein said biasing means is adapted to be responsive to the speed of said drive means so that a change in the speed of said drive means changes the biasing force of said biasing means; and means to selectively vary the speed of said drive means whereby the frictional forces between said drive means and said spherical surface, and thereby the precession rate of said rotor, are selectively variable.

23. The apparatus of claim 21 wherein said drive means is coaxial with said rotor; and including means to selectively vary the axial position of said drive means with respect to said rotor whereby the frictional forces between said drive means and said spherical surface, and thereby the precession rate of said rotor, are selectively variable.

24. The apparatus of claim 23 including a caging means operative in response to a predetermined amount of axial motion of said drive means with respect to said rotor to cage said rotor.

25. The apparatus of claim 20 wherein the center of curvature of said spherical surface is located at the center of said gimbal suspension system.

26. In a moving picture camera which is adapted to focus light rays from an object onto a film station, the combination comprising:
   a camera housing which includes an objective portion and an image portion;
   a first lens mounted in said objective portion of said housing, said film station being at said image portion of said housing;
   a lens support means;
   a second lens mounted in said lens support means;
   a gimbal suspension means mounting said lens support means in said housing, said lens support means being located within said housing so that said first and second lenses form an optical wedge whereby an image from an object is focused at said film station irrespective of relative motion between said lenses;
   a rotor rotatably mounted on said lens support means for concentric rotation with respect to said lens support means about a spin axis that is common with the axis of said second lens;
   drive means mounted within said housing and adapted to drive said rotor about said spin axis so that said rotor and thereby said second lens is stable in space about said spin axis;
      said drive means having a drive axis that is fixed with respect to said housing and said first lens, but movable in space with respect to said common spin and lens axes;
      said drive means being further adapted to coact with said rotor so as to cause said rotor and thereby said second lens to precess into coaxial superposition with said drive axis and said first lens when said drive axis and said first lens are divergent from said spin axis.

27. In a moving picture camera which is adapted to focus light rays from an object onto a film station, the combination comprising;
   a camera housing which includes an objective portion and an image portion;
   a first lens mounted in said objective portion of said housing, said film station being in said image portion of said housing;
   a lens support means;
   a second lens mounted in said lens support means;
   a gimbal suspension means mounting said lens support means in said housing, said lens support means being located within said housing so that said first and second lenses form an optical wedge whereby an image from an object is focused at said film station irrespective of relative motion between said lenses;

a spherically surfaced rotor, rotatably mounted on said lens support means for concentric rotation with respect to said lens support means about a spin axis that is common with the axis of said second lens;

rotatable drive means mounted within said housing for rotation about a drive axis and being in frictional engagement with only a portion of said spherical surface, so that said drive axis and said spin axis are movable relative to each other; and means to rotate said drive means whereby the friction between said drive means and said spherical surface causes said rotor to spin about said spin axis, said rotor thereby being relatively stable in space about said spin, but adapted to precess into coaxial superposition with said drive axis when said drive axis is divergent from said spin axis.

References Cited

UNITED STATES PATENTS

| | | | |
|---|---|---|---|
| 1,586,070 | 5/1926 | Cooke | 95—12.5 |
| 2,709,922 | 6/1955 | Knutson | 74—5.6 |
| 2,951,377 | 9/1960 | Lahde | 74—5.46 X |

JULIA E. COINER, Primary Examiner

U.S. Cl. X.R.

95—12